United States Patent [19]

Drauz et al.

[11] Patent Number: 4,564,514

[45] Date of Patent: Jan. 14, 1986

[54] PROCESS FOR THE PRODUCTION OF WATER-FREE ORGANIC HYDROGEN PEROXIDE SOLUTION

[75] Inventors: Karlheinz Drauz, Freigericht; Axel Kleemann; Rolf Wirthwein, both of Hanau, all of Fed. Rep. of Germany

[73] Assignee: Degussa Aktiengesellschaft, Frankfurt, Fed. Rep. of Germany

[21] Appl. No.: 510,162

[22] Filed: Jul. 1, 1983

[30] Foreign Application Priority Data

Jul. 7, 1982 [DE] Fed. Rep. of Germany ....... 3225307
Mar. 11, 1983 [DE] Fed. Rep. of Germany ....... 3308740

[51] Int. Cl.$^4$ .......................................... C01B 15/023
[52] U.S. Cl. .................. 423/589; 423/658.5; 423/584
[58] Field of Search ................. 423/584–589, 423/658.5

[56] References Cited

U.S. PATENT DOCUMENTS

| | | | |
|---|---|---|---|
| 3,682,781 | 8/1972 | Jones et al. | 423/584 |
| 3,707,444 | 12/1972 | Schreyer et al. | 423/589 |
| 3,737,519 | 6/1973 | Schreyer et al. | 423/589 |
| 3,743,706 | 7/1973 | Kabisch et al. | 423/588 |
| 3,755,185 | 8/1973 | Waldmann et al. | 423/584 |
| 3,761,581 | 9/1973 | Kabisch et al. | 423/589 |
| 3,767,778 | 10/1973 | Giesselmann | 423/588 |
| 3,819,818 | 6/1974 | Giesselmann | 423/589 |

FOREIGN PATENT DOCUMENTS

| | | | |
|---|---|---|---|
| 2125159 | 12/1972 | Fed. Rep. of Germany | 423/529 |
| 0931119 | 7/1973 | United Kingdom | 423/589 |

*Primary Examiner*—Andrew H. Metz
*Assistant Examiner*—Terryence Chapman
*Attorney, Agent, or Firm*—Cushman, Darby & Cushman

[57] ABSTRACT

The production of organic hydrogen peroxide solutions which are practically water-free until now has had the problem of either too high a water content of the solution or too great a loss of hydrogen peroxide through decomposition and passing over as distillate during the distillative drying. By selection of specific esters in combination with commensurately high pressures in the azeotropic removal of water, these disadvantages can be avoided. Extremely low water content solutions of hydrogen peroxide in high boiling solutions are produced by mixing hydrogen peroxide solutions in solvents whose azeotropic boiling point with water is below the boiling point of hydrogen peroxide with higher boiling solvents which form the highest azeotrope with water, whose boiling point is near or above the boiling point of hydrogen peroxide. Thereupon, the mixture is freed from both water and the lower boiling solvent. The mixture can be formed by an in situ method. Production of extremely low water containing solutions of hydrogen peroxide in high boiling solvents are produced by mixing hydrogen peroxide solutions in solvents whose azeotrope boiling point with water is below the boiling point of hydrogen peroxide with higher boiling solvents which form the highest azeotrope with water, whose boiling point is near or above the boiling point of hydrogen peroxide. Thereupon, the mixture is freed from both water and the lower boiling solvent. The above-mentioned mixture can also be produced by an in situ method.

43 Claims, No Drawings

PROCESS FOR THE PRODUCTION OF WATER-FREE ORGANIC HYDROGEN PEROXIDE SOLUTION

BACKGROUND OF THE INVENTION

It is known that the water content of hydrogen peroxide solutions is disturbing in many reactions, e.g., in oxidations or epoxidations, see, e.g., Organic Reactions Vol. 7 page 395 (1953).

Thus, there were early attempts to employ corresponding organic solutions in place of pure aqueous solutions.

However in the production of these types of solutions there are difficulties.

Generally, to obtain organic hydrogen peroxide solutions, there are employed aqueous solutions of hydrogen peroxide as the starting material. These are either only diluted with the desired organic compound and subsequently the water removed by distillation or the aqueous solutions are extracted with the organic compound and if desired the water removed.

In both cases there are indeed obtained organic solutions of hydrogen peroxide whose water content, however, always is approximately 1 weight % or more, see, e.g., German Pat. No. 2038319 and German Pat. No. 2038320 as well as Kabisch U.S. Pat. No. 3,743,706 and British Pat. No. 931,119. The entire disclosures of the aforementioned German patents, Kabisch U.S. Pat., and the British patent are hereby incorporated by reference and relied upon.

Thereby, according to the process of German Pat. Nos. 2038319 and 2038320, there have been attempts to remove the water present in the organic solutions by distillation at reduced pressure or by azeotropic distillation with an additional entraining agent.

In the process of Kabisch U.S. Pat. No. 3,743,706, the extraction agent itself can be used as entraining agent for an azeotropic distillation. However, more precise details are missing.

Also in British Pat. No. 931,119 there is employed a component of the mixture for azeotropic distillation of water. However, in the production of organic hydrogen peroxide solutions from aqueous solutions besides the frequent too high content of water there is manifest a further, more substantial disadvantage.

During the removal of water at the pressures employed, a certain percentage of hydrogen peroxide is entrained with the distillate which leads to substantial losses of hydrogen peroxide. In repeating two of these procedures, the losses were between 0.5 and 0.6 weight %.

Besides, there occur further losses through decomposition in the sump.

In the process of German Pat. Nos. 2,038,319 and 2,038,320, there are employed organic phosphorus compounds or heterocyclic nitrogen compounds, in the process of British Pat. No. 931,119 and Kabisch U.S. Pat. No. 3,743,706 aliphatic or cycloaliphatic esters.

While in Kabisch U.S. Pat. No. 3,743,706 there is present no data in regard to carrying out an azeotropic distillation, in the processes of the other three patents mentioned, the operation is carried out at pressures far below 100 mbar, see the examples.

Although both German patents specify a general pressure range below 400 mbar, repeating the proceedure using triethyl phosphate or N-methyl pyrrolidone at pressures of 400 and 100 mbar resulted in hydrogen peroxide concentrations of 0.28 or 0.6 weight % and 0.26 or 0.8 weight %, respectively, in the distillate.

Besides, there occurs an additional loss of hydrogen peroxide of 7.5 or 4.1 weight % and 4.7 or 3.9 weight % based on the hydrogen peroxide employed. If there is calculated the loss of hydrogen peroxide through the amount of the distillate and the decomposition thus at a distillation of 400 or 100 mbar, the total loss is at least 7-8 weight % of the hydrogen peroxide employed. However, if one distills at substantially lower pressure, i.e., far below 100 mbar, then there are found still higher amounts of hydrogen peroxide in the distillate which amounts can be as much as over one weight percent based on the distillate; however, the examples were carried out at these pressures which were considered as preferred, see loc. cit.

Also, in the use of aliphatic esters as solvents for hydrogen peroxide, the azeotropic removal of water is carried out at pressures which are far below 100 mbar, see British Pat. No. 931,119 Example 1.

Upon repeating the preparation of a solution of hydrogen peroxide in n-propyl acetate and the azeotropic removal of water from this solution, it has turned out that the distillate contains more than 0.5 weight % of hydrogen peroxide at a pressure of 65 mm.

Therefore, according to the state of the art, there must be formed the impression that in a distillative drying of organic hydrogen peroxide solutions which is to be carried out at a reduced pressure necessarily, as a consequence, there must be considerable losses of hydrogen peroxide in large scale carrying out of the process.

However, not only the loss of hydrogen peroxide represents a considerable disadvantage of the previously known process, additionally the distillation residues were not free from water.

Thus, the organophosphorus solutions have e.g., residual water contents which are between 0.97 to 9.5 weight %. However, these types of solutions cannot be employed for oxidation or epoxidation.

Also, in the single example in German Pat. No. 2038320, the water content in the organic phase was 11.4 weight %.

Thus, a task of the process of the present invention is to produce a solution of hydrogen peroxide in an organic solvent in which there is no mentionable loss of hydrogen peroxide employed and which solution has a water content below 0.5 weight %.

SUMMARY OF THE INVENTION

It has now been found that practically water-free organic solution of hydrogen peroxide can be obtained from aqueous solutions of hydrogen peroxide by mixing the aqueous solutions with carboxylic acid esters if the aqueous hydrogen peroxide solutions are mixed with alkyl or cycloalkyl esters of saturated aliphatic carboxylic acids which have a total carbon atom content of 4-8 and form an azeotrope with water and the azeotropic removal of water is carried out at a pressure between 160 and 1000 mbar.

Preferably, the distillation is carried out at 200 to 1000 mbar.

As preferred carboxylic acid esters, there are mentioned: of formic acid: the propylesters to the hexylesters, e.g. propylformate, isopropylformate, n-butylformate, amylformate.

Of acetic acid: the ethyl ester to the hexyl ester, e.g., ethyl acetate, propyl acetate, isopropyl acetate, butyl acetate, sec. butyl acetate, amyl acetate, and hexyl acetate.

Of propionic acid: the methyl ester to the pentyl ester, e.g., methyl propionate, ethyl propionate, propyl propionate, isopropyl proprionate, butyl propionate, and amyl propionate.

Of butyric acid: the methyl ester to the butyl ester, e.g., methyl butyrate, ethyl butyrate, propyl butyrate, and butyl butyrate.

Of valeric acid: the methyl to the propyl ester, e.g., methyl valerate, ethyl valerate, propyl valerate, and isopropyl valerate.

Of caproic acid: methyl caproate and ethyl caproate.

There also can be used methyl pivalate and ethyl pivalate.

Included in the esters are all of the branched chain isomers, e.g., in addition to those mentioned above, t-butyl acetate and t-butyl propionate.

Illustrative cycloalkyl esters are cyclohexyl acetate, cycloamyl acetate, cycloamyl propionate, and cyclopropyl acetate.

It is also possible to employ mixtures of the above-mentioned esters.

Since in the production of practically water-free organic hydrogen peroxide solutions according to the invention the removal of water always takes place through azeotrope formation with the solvent the end point of the removal of water is easy to establish.

The condensate from the distillation column flows into a water separator. When this condensate consists only of pure solvent, i.e. the condensate no longer separates into water and solvent in the separator, the removal of water has ended.

Through the combination of the invention which consists essentially of employing the esters set forth in claim 1, which form a low boiling azeotrope with water, as solvent and carrying out the azeotropic removal of water at the stated pressures which likewise are set forth in claim 1, passage of hydrogen peroxide into the distillate is safely avoided. This is a great advantage compared to the process of German Pat. Nos. 2,038,319 and 2,138,320 in which there is present a homogeneous aqueous-organic solution.

The amounts of carboxylic acid esters which are mixed with the aqueous hydrogen peroxide solution are arbitrary and depend on the desired content of hydrogen peroxide in the organic solvent, as well as the safe handling of the solutions.

Indeed, it is also possible, since the esters mentioned boil below the boiling point of hydrogen peroxide to further concentrate the resulting solutions by distilling off the solvent. Also, solutions whose water content have increased, possibly through a decomposition of the hydrogen peroxide, can be concentrated either as such or after renewed removal of water.

However, this type of concentration by simple distillation off of the solvent is not possible according to German Pat. Nos. 2,038,319 and 2,038,320 because of the boiling point of the solvent in the organic hydrogen peroxide solutions.

This concentration is carried out at pressures of 200 to 1000 mbar.

The aqueous hydrogen peroxide employed normally contains the customary stabilizers, see Ullmann, Enzyklopädie der technischen Chemie. Vol 17, 4th edition page 709.

The process of the invention operates without any additional entraining agent; the resulting azeotrope of water and the solvent of the present invention which is employed demulsifies without difficulties so that the solvent accumulated is immediately available again for addition to the process. This is particularly favorable in the continuous carrying out of the process. Through this, there are eliminated expensive working up processes.

This a further advantage compared to the process of German Pat. Nos. 2,038,319 and 2,038,320.

The process of the invention can be carried out in customary distillation apparatuses such as packed columns and plate-type columns.

As work materials, there can be employed all those which are inert to hydrogen peroxide, as e.g., glass, enamel, aluminum, passivated stainless steel, specific synthetic resins.

The industrial advantage after consists of the fact that organic solutions having a water content which is less than 0.5 weight % can be produced in a simple manner, e.g., without addition of further materials.

Furthermore these solutions can be concentrated without losses by decomposition, whereby removal of water can also take place.

Besides, there occurs in the production of these organic hydrogen peroxide solutions practically no losses of hydrogen peroxide.

Additionally, the solutions produced according to the invention are remarkably stable.

As pointed out above, practically water-free organic solutions of hydrogen peroxide are produced by contacting an aqueous hydrogen peroxide solution with an alkyl or cycloalkyl ester of a saturated aliphatic carboxylic acid having a total of 4 to 8 carbon atoms and which forms an azeotrope with water and carrying out the azeotropic removal of water at pressures between 160-1000 mbar. In this manner, there are obtained organic solutions of hydrogen peroxide whose water content is below 0.5 weight %. Besides, in their production, there are practically no losses of the hydrogen peroxide employed.

Of course, this process is limited to the above-mentioned carboxylic acid esters. However, it would also be desirable to have a process for the production of similar water-free solutions of hydrogen peroxide in higher boiling organic solvents.

It has now been found also that water-free solutions of hydrogen peroxide in high boiling organic solvents can be produced practically without loss of the hydrogen peroxide employed if solutions of hydrogen peroxide in high boiling solvents having a water content up to 1 weight %, preferably below 0.5 weight %, are produced by mixing solutions of hydrogen peroxide in organic solvents which form one or more azeotropes with water whose boiling point is below the boiling point of hydrogen peroxide at normal pressure (i.e., 760 mm), with high boiling organic solvents which form no azeotrope with water or only such azeotropes which boil near or above the boiling point of hydrogen peroxide based on normal pressure, whereby the starting solutions of hydrogen peroxide in the solvents which form azeotropes with water whose azeotropic boiling point is below the boiling point of hydrogen peroxide at normal pressure can be formed even during the direct mixing of aqueous hydrogen peroxide solutions with these azeotrope forming solvents and the high boiling solvents, whereupon the total amount of the solvent forming an azeotrope with water whose azeotrope boiling point is below the boiling point of hydrogen peroxide is distilled off and there is obtained a water-free solution of hydrogen peroxide in the high boiling solvent concerned.

As high boiling organic solvents which form no azeotropes with water or which only form azeotropes whose boiling point at normal pressure is near or above the boiling point of water on the one hand there are employed phosphorus compounds having the formula

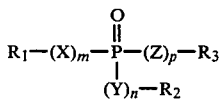

wherein X, Y and Z stand for an O-atom or N—($C_1$–$C_8$)-alkyl group or for a N—($C_4$–$C_7$)-cycloalkyl group, n, m, and p are each 0 or 1, $R_1$, $R_2$, and $R_3$ are straight or branched $C_1$–$C_8$ alkyl or $C_4$–$C_6$ cycloalkyl groups which in a given case can be substituted by halogen (e.g., chlorine, bromine, or fluorine), hydroxyl, $C_1$–$C_4$-alkoxy, —CN, or phenyl groups. Typical examples of such groups and compounds containing such groups are set forth in German Pat. No. 2038319 on col. 3, lines 50 to col. 4, line 68, and col. 8, line 58, to col. 13, line 58. As stated above, the entire disclosure of German Pat. No. 2038319 is incorporated by reference.

Above all, there are suited trialkyl phosphates having $C_1$–$C_8$-alkyl groups for the production of organic solutions of hydrogen peroxide according to the invention. Illustrative to such phosphates are trimethyl phosphate, triethyl phosphate, methyl diethyl phosphate, tributyl phosphate, tripropyl phosphate, triisopropyl phosphate, triisobutyl phosphate, tri sec. butyl phosphate, triamyl phosphate, trihexyl phosphate, trioctyl phosphates tri 2-ethylhexyl phosphate. The preferred phosphate are triethyl phosphate and tributyl phosphate.

Also, there are outstandingly suited according to the invention esters of aromatic carboxylic acids having the structural formula

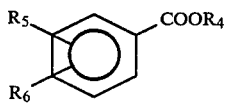

where $R_4$ is the group $CH_3$, $C_2H_5$, n-$C_3H_7$, i-$C_3H_7$, n-$C_4H_9$, i-$C_4H_9$, tert. $C_4H_9$, sec. $C_4H_9$ (i.e., $C_1$ to $C_4$ alkyl), $R_5$ and $R_6$ are substituents which are inert to hydrogen peroxide such as H, halogen, e.g., Cl, F, or Br alkyl such as $R_4$, $CH_3O$, $C_2H_5O$, $COOR_7$ ($R_7$ is as defined for $R_4$) and $R_5$ and $R_6$ can be in any position in relation to the $COOR_4$ group. Thus, there have proven particularly favorable phthalic acid esters, most preferably diethyl phthalate. Other esters include dimethyl phthalate, dibutyl phthalate, diisobutyl phthalate, di-t-butyl phthalate, diisopropyl phthalate, dipropyl phthalate, dimethyl terephthalate, diethyl terephthalate, diethyl isophthalate, methyl benzoate, ethyl benzoate, diethyl 4-chlorophthalate, diethyl 4-fluorophthalate, dimethyl 4-methyl phthalate, diethyl 4-butyl phthalate, 2-methoxy methyl benzoate, 4-methoxy ethyl benzoate, 2-ethoxy ethyl benzoate, trimethyl trimellitate, triethyl trimellitate.

Furthermore, there can be used carboxylic acid amides or lactams of the general formula

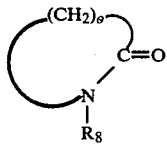

wherein $R_8$ is a straight chain or branched $C_1$–$C_4$ alkyl group, which in a given case can be substituted by halogen, e.g., chlorine, bromine, or fluorine, or a hydroxyl group and o is a number from 2 to 5.

Very good results here have been produced with N-alkyl pyrrolidones having a $C_1$–$C_4$ alkyl group, e.g., N-methyl pyrrolidone, N-ethylpyrrolidone, N-propyl pyrrolidone, N-butyl pyrrolidone, and N-sec. butyl pyrrolidone. Especially preferred is N-methyl pyrrolidone.

Further typical examples of such groups and compounds containing such groups are set forth in German Pat. No. 2038320 on col. 3, line 19 to col. 4, line 12. As stated above, the entire disclosure of German Pat. No. 2038320 is incorporated by reference.

It has also been found that there can be used tetra substituted ureas of the formula

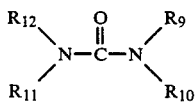

wherein $R_9$, $R_{10}$, $R_{11}$, and $R_{12}$ are $C_1$ to $C_6$ alkyl groups, whereby ureas in which $R_9$, $R_{10}$, $R_{11}$, and $R_{12}$ are the same are preferably used.

Particularly good are tetramethyl urea, tetraethyl urea, and tetrabutyl area. Other illustrative tetrasubstituted ureas include tetrapropyl urea, tetraisopropyl urea, tetra sec. butyl urea, tetrahexyl urea, dimethyl diethyl urea.

Hydrogen peroxide can be present in the invention in any desired concentrated aqueous solution, best suited are solutions having 3 to 90 weight % hydrogen peroxide, preferably 30–85 weight %.

As stated above, as stabilizers for the hydrogen peroxide, there can be used any of the customary ones, e.g., as mentioned in Ullmann, Enzyklopädie der technischem Chemie, Vol. 17, 4th edition, page 709.

As organic solvents which form one or more azeotropes with water, whose boiling point is below the boiling point of hydrogen peroxide at normal pressure, there can be employed ethers such as dioxane, diisopropyl ether, or methyl tert. butyl ether; also there are usable dichloromethane (methylene chloride) and $C_5$–$C_8$ aliphatic hydrocarbons.

Preferred solvents of this type, however, are alkyl or cycloalkyl esters of saturated, aliphatic carboxylic acids which have a total of 4–8 carbon atoms, above all n-propyl acetate or isopropyl acetate or ethyl acetate as well as dichloromethane. The esters can be any of the esters of this class previously mentioned. The concentration of hydrogen peroxide in the aliphatic carboxylic acid ester is, e.g., 3–60 wt. %. Hydrogen peroxide can be dissolved directly in these low boiling solvents or the aqueous hydrogen peroxide solution, as described above, is mixed with the low boiling and the higher boiling solvents and thereupon the azeotrope forming, low boiling solvent is then distilled off together with the water.

When hydrogen peroxide is employed as a solution in the above-described low boiling solvents, then these solutions have a water content of at most 1 weight %, preferably below 0.5 weight %.

The lower boiling solvent or its azeotrope with whatever water may have been introduced into the system, is distilled off at a pressure of 50-1000 mbar.

The pressure used in each case within this range varies with the higher boiling solvent.

The amount of the lower boiling solvent must be at least large enough that the water supplied in a given case can be distilled off as azeotrope with this solvent so that there can be maintained a solution of hydrogen peroxide in the higher boiling solvent having at most 1 weight %, preferably below 0.5 weight % of water. This can be easily established by a preliminary experiment.

Water may be introduced not only by use of aqueous hydrogen peroxide solutions but also by the high boiling solvent itself. Thus, in using organic hydrogen peroxide solutions, the high boiling solvent employed does not need to be water free. The advantage of the process of the invention also consists in that the solutions obtained according to the invention, if their water content should have increased through decomposition of the hydrogen peroxide can have the water removed again through a correspondingly metered addition of low boiling solvent.

The mixture of the hydrogen peroxide solution and solvent is customarily carried out in mixing kettles, preferably equipped with a stirrer.

The process of the invention can be carried out in conventional evaporators and distillation apparatuses, as, e.g., packed and plate-type columns. The same water materials as mentioned on previously, are used.

An industrial advantage of this process according to the invention is in the safety of obtaining hydrogen peroxide solutions in solvents which boil higher than hydrogen peroxide having at most 1 weight % of water, preferably even below 0.5 weight %. Besides in the production of these solutions, there occurs practically no loss of the hydrogen peroxide employed.

These advantages also are the decisive differences from the process of German AS No. 2462957 and German AS No. 2462990, in which hydrogen peroxide is distilled off from the reaction mixture with the reacting phenols or phenolethers which contain as a third component a solvent for hydrogen peroxide, which solvent boils higher than the phenol or phenol ether. The preferred third components according to the examples as well as according to the original application German No. P 2410742.4 (now German AS 2410742) and German No. P 2410758.2 (now German AS No. 2419758) from which the above-mentioned patents are derived is trioctyl phosphate.

The production of the hydrogen peroxide solutions in trioctyl phosphate is not given. Therefore, it is assumed that these solutions were produced in a manner analogous to that described in German Pat. No. 2038319, and, therefore, must contain correspondingly high residual water content. This residual water, of course, passes over into the vapor phase.

Among the requisites in the production of the water-free solutions of hydrogen peroxide in phenols and phenol ethers according to German AS No. 2462957 and German AS No. 2462990 is a high energy expense because of the total vaporization of the phenol component together with the hydrogen peroxide.

Simultaneously, there occur great problems in regard to industrial safety through the common presence of hydrogen peroxide and organic components in the vapor phase, completely apart from the loss of hydrogen peroxide through the distillation.

In contrast, the process of the invention produces water-free solutions which are obtained as sump and not as head products without any lower boiling carrier material.

Unless otherwise indicated, all parts and percentages are by weight.

The process can comprise, consist essentially of, or consist of the stated steps with the recited materials.

The process of the invention is further explained in the following examples.

EXAMPLE 1

There were added to a solution of 539.8 grams of $H_2O_2$ in 230.2 grams of $H_2O$ (corresponding to a 70.1 weight % aqueous $H_2O_2$ solution), 890.0 grams of n-propyl acetate having a water content of 0.5 weight % (corresponding to 4.45 grams of $H_2O$), and there was distilled at a vacuum of 250 mbar (i.e., at a pressure of 250 mbar) via an 80 cm long glass column provided with glass packing and a water separator in all 234.0 grams of water and 431.5 grams of ester.

Thereby, the sump temperature increased from an initial 62° C. to 76° C., the head temperature reached a maximum of 47° C.

The water distilled off had an $H_2O_2$ content of 0.02 weight %. There was no detectable hydrogen peroxide content in the ester distilled off.

As residue, there was obtained 997.5 grams of a 53.95 weight % solution of $H_2O_2$ in n-propyl acetate. The residue water content was 1.65 grams, corresponding to 0.16 weight %. The aqueous condensate was discarded. The n-propyl acetate distilled off was recovered.

EXAMPLE 2

From 600.0 grams of a 53.9 weight % water-free solution of $H_2O_2$ in n-propyl acetate produced according to example 1, there were distilled off at 250 mbar, 124.5 grams of pure n-propyl acetate.

In the sump of the distillation, there remained a solution of 323.0 grams of $H_2O_2$ in 152 grams of ester, which represents a 68.0 weight % water free solution of $H_2O_2$ in n-propyl acetate. (The increase in concentration of the hydrogen peroxide is 14.1%).

Thus, Example 2 shows that lower concentrated organic solutions of hydrogen peroxide can be concentrated in a simple manner.

EXAMPLE 3

There were added 1500 grams of isopropyl acetate having a water content of 0.05 wt. % (corresponding to 0.75 gram of water) to a solution of 819.0 grams of $H_2O_2$ in 351 grams of water (corresponding to a 70.0 wt. % aqueous $H_2O_2$ solution) and there were distilled in a vacuum of 300-280 mbar (i.e., at a pressure of 300-280 mbar) in a manner analogous to Example 1 in all 351.2 grams of water and 552.2 grams of ester.

The sump temperature thereby was between 60° and 62° C., the head temperature reached a maximum value of 44° C. The water distilled off had an $H_2O_2$ content of <0.01 wt. %, the distilled ester showed no $H_2O_2$.

As residue, there was obtained 1777 grams of a 46.09 wt. % solution of $H_2O_2$ in isopropyl acetate.

The residual water content was 0.55 g, corresponding to 0.031 wt. %.

EXAMPLE 4

There were added 667.5 grams of ethyl acetate having a water content of 0.02 wt. % (corresponding 0.13 gram $H_2O$) to a solution of 406.7 grams of $H_2O_2$ in 172.6 grams of $H_2O$ (corresponding to a 70.2 wt. % aqueous $H_2O_2$ solution), and there were distilled in a vacuum of 600 mbar (i.e., a pressure of 600 mbar) in a manner analogous to Example 1 172.0 grams of $H_2O$. In the course of the azeotropic distillation, there were added again 348.0 grams of ethyl acetate having a content of 0.07 gram of $H_2O$ and the pressure reduced to 400 mbar. At this pressure, the sump temperature at the end was 73° C., the head temperature 40° C. In all, there were distilled off 558.3 grams of ethyl acetate.

The water distilled off had an $H_2O_2$ content of <0.01 wt. %; the distilled ester was free from hydrogen peroxide.

As residue, there was obtained 964.9 grams of a 42.1 wt. % solution of $H_2O_2$ in ethyl acetate. The residual water content was 0.8 gram, corresponding to 0.083 wt. %.

EXAMPLE 5

There were distilled off at 400 mbar 178.0 grams of pure ethyl acetate from 550.5 grams of a 42.1 wt. % water free solution of $H_2O_2$ in ethyl acetate produced according to Example 4.

There remained in the distillation sump 231.7 grams of $H_2O_2$ in 140.7 grams of ester which corresponds to a 62.2 wt. % water free solution of $H_2O_2$ in ethyl acetate. Thus, even this lower concentrated hydrogen peroxide solution can be concentrated in simple manner.

EXAMPLE 6

There were added 879.5 grams of methyl propionate having a water content of 1.78 wt. % (corresponding to a portion of 15.7 grams of $H_2O$) to a solution of 406.6 grams of $H_2O_2$ in 172.6 grams of $H_2O$ corresponding to a 70.2 wt. % aqueous $H_2O_2$ solution), and there were distilled at a vacuum of 600 to 400 mbar in all 188.0 grams of $H_2O$ and 361.8 grams of ester.

The sump temperature increased from an initial 56° C. to 73° C., the azeotrope passed over at 39°–44° C. The water distilled off have an $H_2O_2$ content of <0.01 wt. %; the ester distilled off was free from hydrogen peroxide.

As residue, there was obtained 920.7 grams of a 43.78 wt. % of a solution of $H_2O_2$ in methyl propionate. The residual water content was 0.3 gram-corresponding to 0.03 wt. %.

EXAMPLE 7

There was added 1157.7 grams of ethyl propionate having a water content of 0.085 wt. % (corresponding to 0.98 gram of $H_2O$) to a solution of 406.5 grams of $H_2O_2$ in 171.4 grams of $H_2O$ (corresponding to a 70.34 wt. % aqueous solution) and there distilled at a pressure of 200 mbar in all 172.0 grams of $H_2O$ and 709.2 grams of ester.

The sump temperature increased from an initial 56.5° C. to 66.5° C. The water distilled off had an $H_2O_2$ content of 0.01 wt. %; hydrogen peroxide could not be detected in the distilled ester.

As residue, there was obtained 850.8 grams of a 47.3 wt. % solution of $H_2O_2$ in ethyl propionate. The residual water content was 0.38 gram, corresponding to 0.04 wt. %.

EXAMPLE 8

There were added 666.7 grams of ethyl pivalate and 520.0 grams of ethyl acetate to a solution of 405.9 grams of $H_2O_2$ in 174.0 grams of $H_2O$ (corresponding to a 70.0 wt. % of an aqueous $H_2O_2$ solution). The ester mixture had a water content of 0.05 wt. % (corresponding to 0.59 gram of $H_2O$) and there distilled at a vacuum of 600 mbar, analogous to Example 4, 173.5 grams of $H_2O$ and 273.7 grams of ester.

The sump temperature reached 72° C., the head temperature 39° C.

The water distilled off had an $H_2O_2$ content of <0.01 wt. %; the ester distilled off was free of hydrogen peroxide.

A residue, there were obtained 1314.0 grams of a 30.8 wt. % solution of $H_2O_2$ in a mixture of ethyl acetate and ethyl pivalate.

The residual water content was 1.1 grams, corresponding to 0.08 wt. %.

EXAMPLE 9

There were added 440.0 grams of n-butyl acetate and 622.6 grams of n-propyl acetate to a solution of 406.9 grams of $H_2O_2$ in 172.8 grams of $H_2O$ (corresponding to a 70.2 wt. % aqueous $H_2O_2$). The ester mixture had a water content of 0.06 wt. % (corresponding to 0.5 gram of $H_2O$). Analogous to Example 1, there were distilled off at 250 mbar 314.1 grams of ester and 172.5 grams of $H_2O$.

The sump temperature reached 78.5° C., the head temperature 46.5°; the $H_2O$ distilled off had an $H_2O_2$ content of <0.01 wt. %; the organic phase distilled off was free of hydrogen peroxide.

As a residue, there were obtained 1155 grams of a 35.12 wt. % solution of $H_2O_2$ in a mixture of n-propyl acetate and n-butyl acetate.

The residual water content was 0.8 gram, corresponding to 0.97 wt. %.

EXAMPLE 10

Stabilization Test in Storage Experiments

Water free solutions of $H_2O_2$ in saturated carboxylic acid esters were stored for 3 or 6 months. In each case, 500 ml of a solution of $H_2O_2$ in ester were stored in a 2 liter synthetic resin flask (polyethylene) at temperature between 20° and 25° C.

The $H_2O_2$ content was determined potentiometrically at the beginning and the at end of storage.

| Solutions of $H_2O_2$ in | $H_2O_2$ Conc. at the beginning (Wt. %) | $H_2O_2$ Conc. at the end (Wt. %) | Decrease (Wt. %) |
|---|---|---|---|
| 6-Months Storage Experiments | | | |
| ethyl acetate | 25.58 | 25.12 | 0.46 |
| propyl acetate | 28.00 | 27.63 | 0.37 |
| n-butyl acetate/ n-propyl acetate | 23.16 | 22.88 | 0.28 |
| methyl propionate | 31.10 | 30.59 | 0.51 |
| ethyl propionate | 29.57 | 29.11 | 0.46 |
| 3-Months Storage Experiments | | | |

-continued

| Solutions of $H_2O_2$ in | $H_2O_2$ Conc. at the beginning (Wt. %) | $H_2O_2$ Conc. at the end (Wt. %) | Decrease (Wt. %) |
|---|---|---|---|
| ethyl acetate | 42.12 | 41.68 | 0.46 |
| propyl acetate | 53.39 | 52.91 | 0.48 |
| n-butyl acetate/n-propyl acetate | 35.12 | 34.71 | 0.41 |
| methyl propionate | 43.78 | 43.25 | 0.53 |
| ethyl propionate | 47.28 | 46.89 | 0.39 |

In principle, all aqueous hydrogen peroxide solutions can be employed in this process of the invention. However, especially favorable are solutions of about 35–70 wt. %.

At lesser concentrations, too much water must be distilled off, and at higher concentrated hydrogen peroxide solutions, there can come into consideration industrial safety aspects.

EXAMPLE 11

There were added 420.0 grams of triethyl phosphate to 421 grams of a 42.74 wt. % solution of hydrogen peroxide in isopropyl acetate ($\simeq$179.9 grams $H_2O_2$) having a residual water content of 0.03 wt. %. There were distilled off at a vacuum between 250–350 mbar (pressure of 250–350 mbar) 240.3 grams of isopropyl acetate having an $H_2O_2$ content of 0.01 wt. %. The sump temperature was between 75° and 77° C., the head temperature reached a maximum of 48° C. There remained in the sump 600.0 grams of a 29.91 wt. % water free solution of $H_2O_2$ in triethyl phosphate. There is no longer detectable a residual water content (less than 0.01 wt. %) measured in conjunction with the preparation.

EXAMPLE 12

There were added 400.0 grams of diethyl phthalate to 250.0 grams of a water free solution of $H_2O_2$ in isopropyl acetate having a hydrogen peroxide content of 44.10 wt. % and a residual water content of 0.03 wt. % and there distilled off via a column at a vacuum of 100–50 mbar (pressure of 100–50 mbar 138.7 grams of isopropyl acetate. The sump temperature increased from an initial 65° C. to 73.5° C. The head temperature reached a maximum value of 29° C. There remained in the sump 508.5 grams of a 21.5 wt. % water free solution of hydrogen peroxide in diethyl phthalate. A residual water content was no longer detectable (less than 0.01 wt. %), measured as in Example 11.

EXAMPLE 13

There were added 350.0 grams of N-methylpyrrolidone-2 to 363.0 grams of an essentially water free solution of $H_2O_2$ in isopropyl acetate having an $H_2O_2$ content of 42.74 wt. % and a residual water content of 0.03 wt. % and there distilled off at a vacuum of 400–350 mbar 207.3 grams of isopropyl acetate over a column. The isopropyl acetate showed an $H_2O_2$ content of 0.05 wt. %.

The sump temperature increased from an initial 71° C. to 76° C., the head temperature reached a maximum value of 53° C. There remained in the sump 507.0 grams of a 30.5 wt. % solution of hydrogen peroxide in N-methylpyrrolidone. There was no longer detectable a residual water content (less than 0.01 wt. %) measured as in Example 11.

EXAMPLE 14

There were added 250.0 grams of isopropyl acetate and 257.0 grams of a 70.0 wt. % $H_2O_2$ solution (corresponding to 179.9 grams of $H_2O_2$) to 420.0 grams N-methylpyrrolidone-2. There were distilled off at a vacuum of 350–370 mbar and head temperature of 52°–56° C. 77.0 grams of $H_2O$ via a water separator. The $H_2O_2$ content of the $H_2O$ distilled off was 0.05 wt. %. Subsequently, the residual isopropyl acetate distilled off at 200–250 mbar. The content of $H_2O$ in the ester was <0.01 wt. %. There remained in the sump 608.0 grams of a 29.6 wt. % water free solution of $H_2O_2$ in N-methylpyrrolidone-2. The residual water content was 0.01 wt. %, measured as in Example 11.

EXAMPLE 15

There were added 395.0 grams of a 45.6 wt. % water free solution of hydrogen peroxide in isopropyl acetate ($\simeq$180.1 grams of $H_2O_2$ (100%)) having a residual water content of 0.03 wt. % to 420.0 grams of tetramethyl urea. There distilled off over a column at a pressure of 260–170 mbar 213.6 grams of isopropyl acetate. The isopropyl acetate showed a hydrogen peroxide content of 0.1 wt. %.

The sump temperature increased from an initial 68° C. to 74° C., the head temperature reached a maximum value of 46° C. There remained in the sump 598.2 grams of a 29.98 wt. % of a water free solution of hydrogen peroxide in tetramethyl urea. There was no longer detectable a residual water content (less than 0.01 wt. %) measured as in Example 11.

COMPARISON EXAMPLE TO EXAMPLE 15

There were added 449.7 grams of freshly distilled tetramethyl urea to a solution of 190.8 grams of hydrogen peroxide in 84.8 grams of water ($\simeq$ of a 69.22 wt. % aqueous hydrogen peroxide solution and there distilled off over a column at a vacuum of 65–25 mbar 104.03 grams of a 15.3 wt. % aqueous $H_2O_2$ solution ($\simeq$88.0 grams of $H_2O$). The sump temperature increased from an initial 60° C. to 77.5° C. The head temperature reached a maximum value of 53° C. As residue, there were obtained 616.0 grams of a 26.23 wt. % solution of $H_2O_2$ in tetramethyl urea.

(The comparison example was not produced according to the process of the invention).

The entire disclosures of German priority applications Nos. P 3225307.9 and P 3308740.7 are hereby incorporated by reference.

What is claimed is:

1. A process for the production of a practically water-free organic solution of hydrogen peroxide comprising (1) mixing an aqueous hydrogen peroxide solution with an alkyl or cycloalkyl ester of a saturated aliphatic carboxylic acid, said ester having a total of 4 to 8 carbon atoms and being capable of forming an azeotrope with water, and (2) azeotropically removing water from the mixture at a pressure between 160 and 600 mbar to leave as a residue hydrogen peroxide dissolved in said ester.

2. A process according to claim 1 wherein the carboxylic acid is an alkanoic acid having 2 to 6 carbon atoms.

3. A process according to claim 2 wherein the ester is an alkyl alkanoate.

4. A process according to claim 3 wherein the azeotrope consists of water and the ester.

5. A process according to claim 1 wherein the azeotropic distillation is continued until the water content of the distillation residue is below 0.5 wt. %.

6. A process according to claim 5 wherein the azeotropic distillation is continued until the water content of the distillation residue is below 0.5 wt. %.

7. A process according to claim 5 wherein the azeotrope consists of water and the ester.

8. A process according to claim 5 wherein the distillation is continued until the solution of hydrogen peroxide in the ester contains 42 to 68% wt% of hydrogen peroxide.

9. A process according to claim 5 wherein the azeotropic distillation is continued until the water content of the residue is not over 0.16 wt. %.

10. A process according to claim 9 wherein the distillation is continued until the water content of the residue is not over 0.031 wt. %.

11. A process according to claim 9 wherein the azeotrope consists of water and the ester.

12. A process according to claim 1 wherein the carboxylic acid ester is ethyl acetate, n-propyl acetate, isopropyl acetate, methyl propionate, ethyl propionate, ethyl pivalate, n-butyl acetate, or a mixture of at least two of said esters.

13. A process according to claim 1 wherein the azeotropic distillation is carried out at 200 to 600 mbar.

14. A process according to claim 1 including the further step of concentrating the solution of hydrogen peroxide in the ester by distilling off ester therefrom at 200 to 1000 mbar.

15. A process according to claim 14 wherein the further step is continued to increase the concentration of the hydrogen peroxide at least 14.1%.

16. A process wherein the azeotrope consists of water and the ester.

17. A process for the production of a substantially water free solution of hydrogen peroxide in a high boiling organic solvent having less than 1 wt. % of water comprising (1) preparing a mixture of (a) a solution of hydrogen peroxide in a lower boiling organic solvent which forms at least one azeotrope with water having a boiling point below the boiling point of hydrogen peroxide at normal pressure with (b) a higher boiling organic solvent and which does not form an azeotrope with water or which forms an azeotrope with water that boils near or above the boiling point of hydrogen peroxide and also above the boiling point of the azeotrope of hydrogen peroxide with said lower boiling solvent and (2) distilling off all of the solvent which forms the low boiling azeotrope with water to produce a substantially water free solution of hydrogen peroxide in the higher boiling solvent.

18. A process according to claim 17 wherein the solvent forming the low boiling azeotrope is used in an amount sufficient that the amount of water in the solution of hydrogen peroxide in the higher boiling solvent is below 0.5 wt. %.

19. A process according to claim 17 wherein the solvent forming the low boiling azeotrope is used in an amount sufficient that the amount of water in the solution of hydrogen peroxide in the higher boiling solvent is not over 0.01 weight %.

20. A process according to claim 17 wherein the solvent forming the low boiling azeotrope is used in an amount sufficient that the amount of water in the solution of hydrogen peroxide in the higher boiling solvent is not detectable with an instrument that can detect 0.01 weight %.

21. A process according to claim 17 wherein the solution of hydrogen peroxide in the organic solvent forming the low boiling azeotrope is preformed.

22. A process according to claim 17 wherein there is employed a solution of hydrogen peroxide in an alkyl or cycloalkyl ester of a saturated aliphatic carboxylic acid, said ester having a total of 4 to 8 carbon atoms as the solvent forming a low boiling azeotrope.

23. A process according to claim 1 wherein the azeotrope consists of water and the ester.

24. A process according to claim 22 wherein the ester is an alkyl alkanoate wherein the alkanoic acid has 2 to 6 carbon atoms.

25. A process according to claim 24 wherein there is employed a solution of hydrogen peroxide in n-propyl acetate or isopropyl acetate.

26. A process according to claim 17 wherein the high boiling organic solvent has the formula

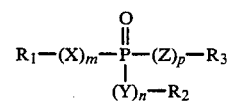

wherein X, Y, and Z are O, a N—($C_1$–$C_8$)-alkyl group or a N—($C_4$–$C_7$)-cycloalkyl group, n, m, and p are each 0 or 1, $R_1$, $R_2$, and $R_3$ are $C_1$–$C_8$ alkyl or $C_4$–$C_6$-cycloalkyl or such an alkyl or cycloalkyl group substituted by halogen, hydroxyl, $C_1$–$C_4$-alkoxy, —CN, or phenol.

27. A process according to claim 26 wherein the high boiling solvent is a trialkyl phosphate having 1 to 8 carbon atoms in each alkyl group.

28. A process according to claim 27 wherein the phosphate is triethyl phosphate.

29. A process according to claim 17 wherein the high boiling solvent has the formula

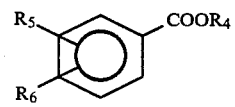

wherein $R_4$ is an alkyl group having 1 to 4 carbon atoms and $R_5$ and $R_6$ are substituents inert to hydrogen peroxide.

30. A process according to claim 29 wherein $R_5$ and $R_6$ are H, Cl, F, alkyl having 1 to 4 carbon atoms, methoxy, ethoxy, or $COOR_7$ where $R_7$ is alkyl having 1 to 4 carbon atoms.

31. A process according to claim 30 wherein the high boiling solvent is an ester of phthalic acid.

32. A process according to claim 29 wherein the high boiling solvent is diethyl phthalate.

33. A process according to claim 17 wherein the high boiling solvent has the formula

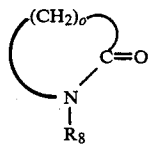

wherein $R_8$ is alkyl of 1 to 4 carbon atoms or such a group substituted by halogen, hydroxy, or a $C_1$ to $C_3$ alkyl group and o is a number from 2 to 5.

34. A process according to claim 33 wherein the high boiling solvent is an N-alkylpyrrolidone having 1 to 4 carbon atoms in the alkyl group.

35. A process according to claim 34 wherein the N-alkylpyrrolidone is N-methylpyrrolidone.

36. A process according to claim 16 wherein the high boiling solvent is a tetraalkyl substituted urea of the formula

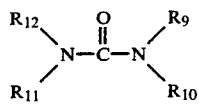

wherein $R_9$, $R_{10}$, $R_{11}$, and $R_{12}$ are alkyl of 1 to 6 carbon atoms.

37. A process according to claim 36 wherein $R_9$, $R_{10}$, $R_{11}$, and $R_{12}$ are the same.

38. A process according to claim 37 wherein the tetraalkyl urea is tetramethyl urea, tetraethyl urea, or tetrabutyl urea.

39. A process according to claim 17 wherein the solvent forming the low boiling azeotrope with water is distilled off with the water at a pressure of 50 to 1000 mbar.

40. A process according to claim 39 wherein sufficient solvent forming a low boiling azeotrope with water is employed that the water present is completely removed by the azeotropic distillation.

41. A process according to claim 17 wherein sufficient solvent forming a low boiling azeotrope with water is employed that the water present is completely removed by the azeotropic distillation.

42. A process according to claim 17 wherein the distillation is continued until the solution of hydrogen peroxide in the higher boiling solvent is 21.5 to 30.5%.

43. A process according to claim 17 wherein aqueous hydrogen peroxide solution is directly mixed with the lower boiling organic solvent which forms an azeotrope with water and the higher boiling organic solvent.

* * * * *